United States Patent [19]
DiRisio et al.

[11] Patent Number: 6,033,133
[45] Date of Patent: Mar. 7, 2000

[54] SHUTTER MECHANISM FOR CAMERAS

[75] Inventors: Anthony DiRisio, Rochester; David Cipolla, Macedon; Mark A. Lamphron, Rochester, all of N.Y.

[73] Assignee: Eastman Kodak Company, Rochester, N.Y.

[21] Appl. No.: 09/137,718

[22] Filed: Aug. 21, 1998

[51] Int. Cl.[7] .................................................. G03B 9/10
[52] U.S. Cl. ........................................................ 396/493
[58] Field of Search .................................. 396/493, 494, 396/452, 439

[56] References Cited

U.S. PATENT DOCUMENTS

| | | |
|---|---|---|
| 3,405,624 | 10/1968 | Peterson . |
| 3,661,066 | 5/1972 | Ettischer et al. . |
| 3,672,285 | 6/1972 | Stoneham . |
| 3,713,374 | 1/1973 | Shiratory et al. . |
| 4,775,872 | 10/1988 | Smart . |
| 5,754,891 | 5/1998 | Chan . |
| 5,754,892 | 5/1998 | Yuito et al. . |
| 5,890,026 | 3/1999 | Smith et al. ............................ 396/493 |

FOREIGN PATENT DOCUMENTS 6-82976   3/1994   Japan .

*Primary Examiner*—W. B. Perkey
*Attorney, Agent, or Firm*—Svetlana Z. Short

[57] ABSTRACT

A shutter mechanism for a camera comprises a support including an integrally formed post and a retainer defining a path; a HEL with a projecting finger, the finger being movable along the path; and a shutter blade pivotally mounted on the post. The shutter blade has a lever portion and a masking portion and is movable into an exposure position by the finger. According to one embodiment the support is a camera frame. According to another embodiment the support is a mechanical plate.

14 Claims, 5 Drawing Sheets

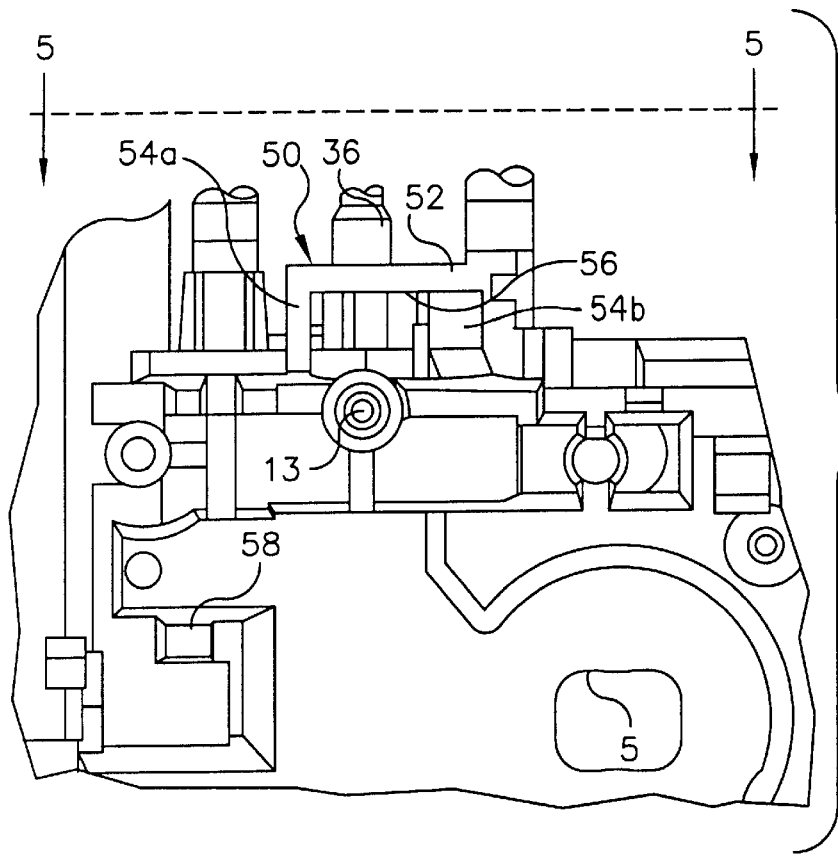
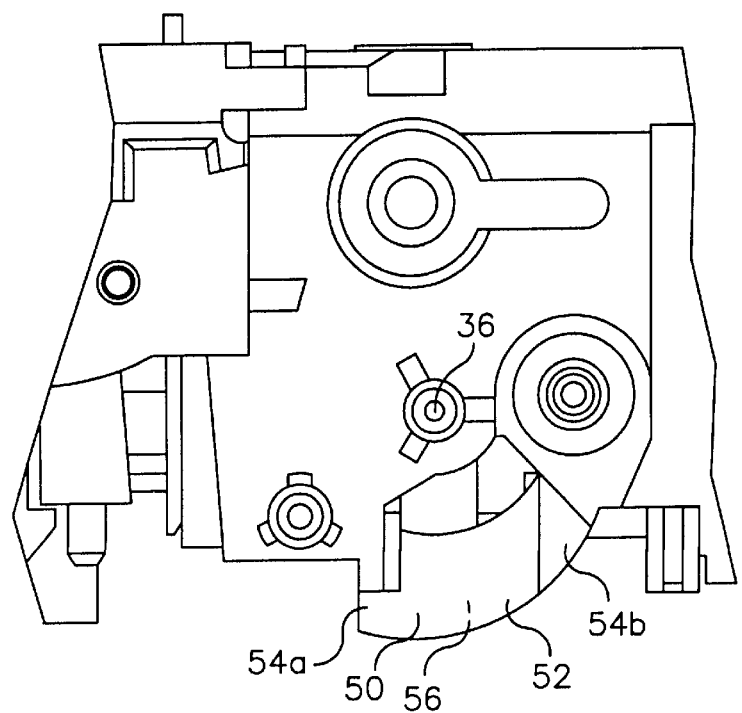
FIG. 4
FIG. 5

SHUTTER MECHANISM FOR CAMERAS

CROSS-REFERENCE TO RELATED APPLICATION

Cross-reference is made to commonly assigned, copending U.S. application Ser. No. 09/137,737 entitled "Shutter Mechanism" filed concurrently herewith.

FIELD OF THE INVENTION

This invention relates to a shutter mechanism for use in a photographic camera and more specifically to a shutter mechanism that includes an integrally formed post for the shutter blade and a retainer.

BACKGROUND OF THE INVENTION

In order to make a photographic exposure with a camera, a camera housing is provided with an exposure aperture through which light can pass to expose film in the camera. A shutter blade normally closes this aperture to prevent the undesired entry of light through the aperture. The shutter blade is actuated by a shutter mechanism to open the aperture for a predetermined period of time to admit light through the aperture. The shutter mechanism must operate to a high degree of accuracy and reliability if the film is to be exposed properly. Not only must the aperture be opened for the correct total amount of time for proper exposure but, the movement of the shutter blade must be such that this exposure is uniform across the entire area of the film. For example, a shutter blade which sticks or drags slightly across part of its stroke can result in parts of the same film exposure being overexposed and underexposed (known as "shadowing" in the art), even when the average amount of light striking the film over the exposure time is within proper limits.

The necessity for a carefully controlled shutter operation exists in simple, inexpensive cameras as well as in the more sophisticated cameras, and the designer of the simple camera must provide an uncomplicated but accurate and reliable shutter mechanism if the costs of manufacture are to be minimized.

A type of a shutter mechanism commonly used on lower priced cameras includes a pivotable shutter blade which is mounted on a post. The shutter blade pivots between two positions—an aperture closed position and an aperture open position. Such shutters are of the "impact" variety, and are pivotable in response to the release of a spring driven finger which strikes a short lever on one side of the shutter blade to pivot it momentarily into the open position. A return spring is used to bias the shutter blade towards the closed position. If the post is misaligned with respect to the high energy lever, the timing of the shutter blade during the "aperture open" position may be off, resulting in a wrong exposure. This problem can be corrected by tighter tolerances on parts and assembly, but this raises the cost of the camera.

U.S. Pat. No. 3,672,285 shows a camera with a mechanical plate having a slot. This slot defines a path of the striking finger of the high energy lever (HEL). FIGS. 1 and 2 of the patent show a post protruding through the shutter blade. The patent is silent with respect to how the post is attached to its support or protrudes through a hole.

U.S. Pat. No. 5,754,891 discloses a shutter mechanism of the "impact" variety including a pivotable shutter blade. The mechanism includes a lens 31 and a casing with an "uppermost horizontally extending" open hook for engaging the finger of the high energy lever (HEL).

Japanese laid open patent application (Kokai) No. 6-82976 also discloses a shutter mechanism of the "impact" variety. Here, a drive mechanism that includes a HEL strikes a lever on one end of the shutter blade, forcing the shutter blade to pivot into the open position. The HEL is formed from an arm connected at one end to a finger for striking the lever on one side of the shutter blade. The opposite end of the arm is connected to a bushing rotatably mounted onto a post. The bushing is spring loaded via a torsion spring. When the torsion spring is released by pushing the shutter button, the finger of the HEL sweeps across an arc that strikes the lever of the shutter blade. The shutter blade is pivotably mounted on a post. While the mechanism disclosed in the '976 patent application is capable of performing its intended function, the inventors have observed several shortcomings in its design that can lead to operational unreliabilities. For example, because the finger of the HEL is supported by a lens mounting plate which is separately installed onto the body of the camera during manufacture, these two parts must be assembled with a high degree of precision if the HEL is to be effectively supported in its proper position throughout its arcuate stroke. The HEL rests on a separate part (lens mounting plate) while the shutter is supported by another part. Because two different parts are involved, the cumulative manufacturing tolerances on the HEL positioning relative to the shutter blade post, as well as the manufacturing tolerances on the lens plate and the mechanical plate, may result in a positioning of the shutter blade and/or finger of the HEL slightly higher or lower than its intended position, resulting again in either no support for the HEL finger or excessive friction which lead to improper exposure. Worse yet, the manufacturing and assembly tolerances may add up to the extent where the finger of the HEL sweeps over the lever of the shutter blade without striking it. In such as case, the shutter will not open and the picture will be missed.

Of course, these problems could be solved by increasing the accuracy of parts and assembly, but such a solution would increase the cost of the camera.

Clearly, there is a need for an shutter assembly which enhances the reliability and accuracy of the shutter of a simple, inexpensive camera without significantly increasing the need for parts of tighter tolerances and the consequent increase of manufacture. Ideally, such design should enhance the performance of the camera as a whole, while simplifying its structure and assembly costs.

SUMMARY OF THE INVENTION

Generally speaking, the invention is a shutter mechanism for a low-cost camera that overcomes the previously mentioned shortcomings. To this end, the shutter mechanism comprises a support including an integrally formed post and a retainer defining a path; a HEL with a projecting finger, the finger being movable along the path; and a shutter blade pivotally mounted on the post. The shutter blade has a lever portion and a masking portion and is movable into an exposure position by the finger. According to one embodiment the support is a camera frame. According to another embodiment the support is a mechanical plate.

BRIEF DESCRIPTION OF THE DRAWINGS

FIG. 4 is an enlarged front view of the shutter mechanism illustrated in FIG. 1 shown without the HEL or the shutter blade to better portray the HEL retainer of the shutter mechanism.

FIG. 5 is an elevational view of the shutter mechanism illustrated in FIG. 4 along the line 5—5.

DETAILED DESCRIPTION OF THE INVENTION

Figure 1:
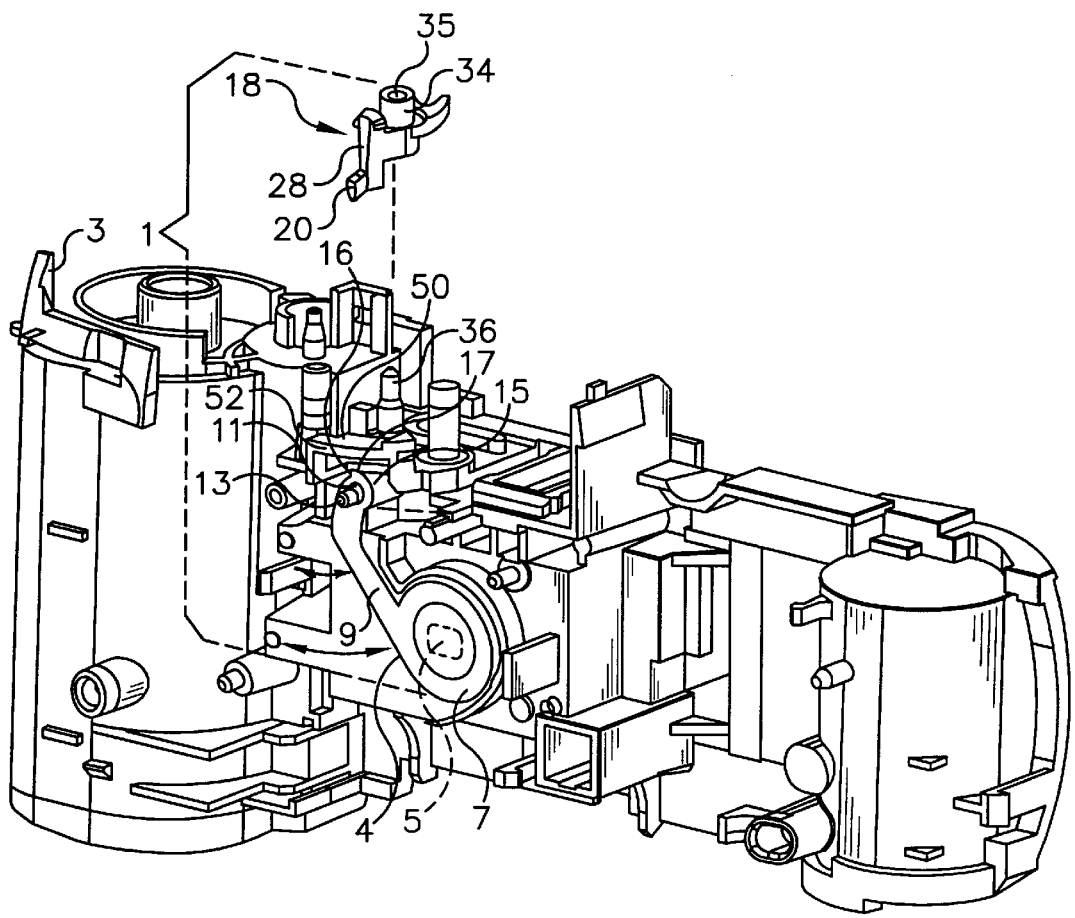
FIG. 1 is an exploded, perspective view of the shutter mechanism of the first embodiment, illustrating how it is assembled into the molded frame of an inexpensive camera.
Figure 6:
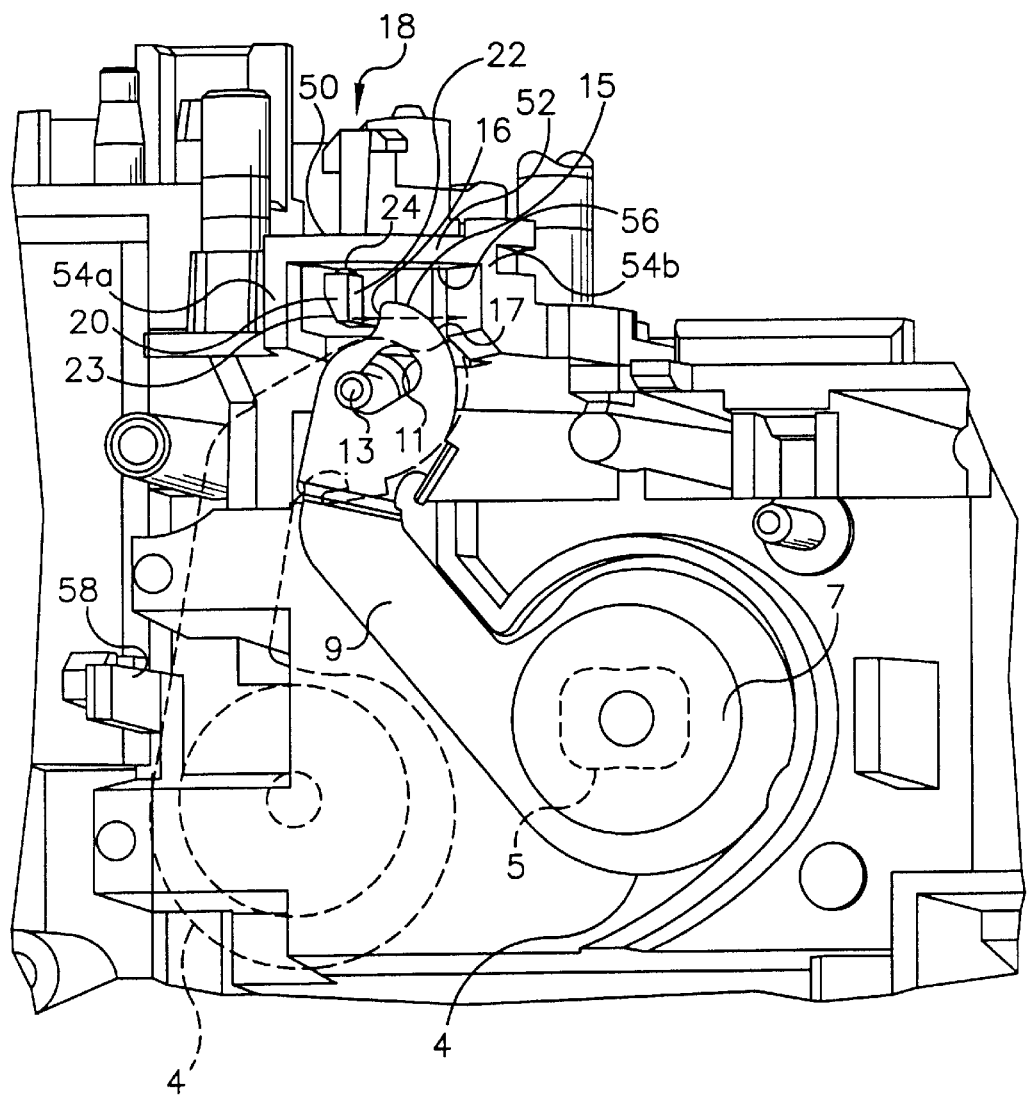
FIG. 6 is an enlarged, assembled view of the shutter mechanism illustrated in FIG. 1 demonstrating how the finger of the HEL is guided along an arcuate path by the HEL retainer to strike the lever portion of the shutter blade to effect an exposure.

With reference to FIG. 1, wherein like numerals designate like components throughout all of the several figures, a shutter mechanism 1 of the first illustrative embodiment is particularly adapted for use with an integrally molded, plastic frame 3 of an inexpensive camera. In such cameras, a shutter blade 4 is spring biased into a light-blocking position over an aperture 5 as illustrated in FIG. 1. The purpose of the shutter mechanism 1 is to momentarily pivot the circular mask 7 of the blade 4 away from the light aperture 5 so that a portion of light sensitive film (not shown) stretched across the backside of the camera frame 3 will momentarily receive a focused image from a lens assembly (also not shown) mounted behind the blade 4. To this end, the circular mask 7 of the shutter blade 4 is connected to an arm 9 having a cam opening 11 that receives a post 13. The post 13 is integrally molded with the frame 3. Thus, the position of the post 13 does not change with respect to the frame and, therefore, the position of the shutter blade 4 with respect to frame 3 does not vary due to the assembly tolerances on the post's position. The arm 9 terminates in a short lever portion 15 disposed just above the post 13. As is best seen in FIG. 6, the lever portion 15 includes both a relatively straight striking surface 16 on its left side, and a rounded cam surface 17 on its right side. When the surface 16 of the lever portion 15 is struck by another component (described below) of the spring loaded shutter mechanism 1, the arm 9 of the shutter blade 4 is pivoted along the arcuate path illustrated in FIG. 1 into the position indicated by dashed lines in FIG. 6 in order to allow light to pass through the aperture 5.

Figure 2:
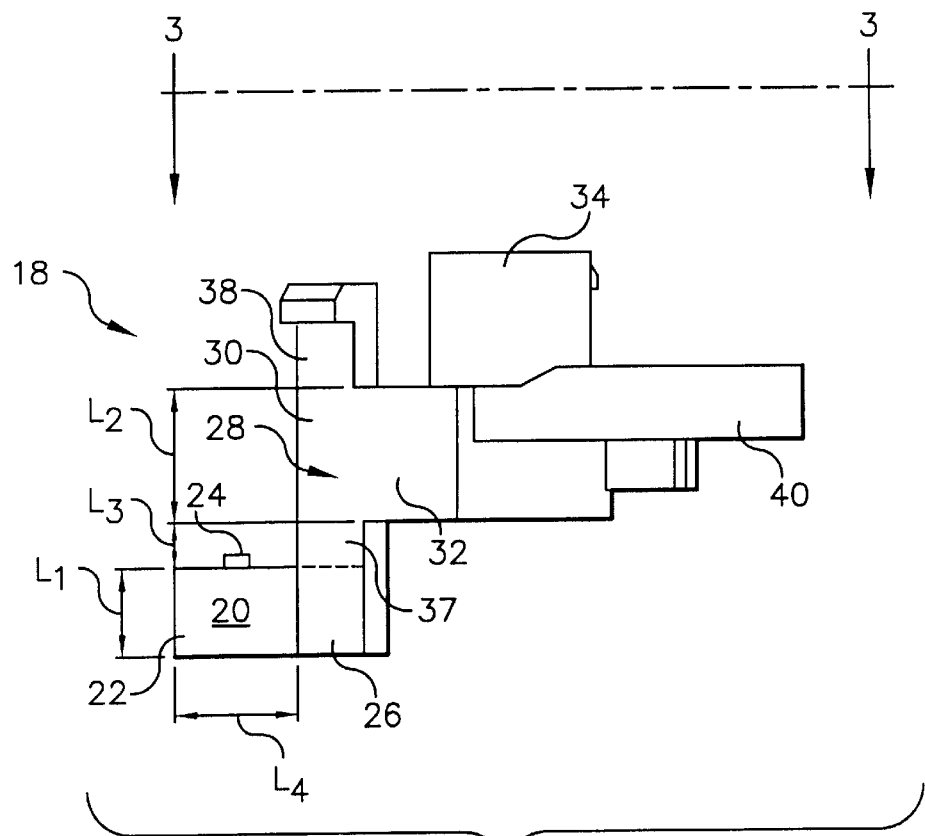
FIG. 2 is a side view of the high energy lever (HEL) of the shutter mechanism, illustrating the relative proportions between the length of the lever finger and the length of the support arm.
Figure 3:
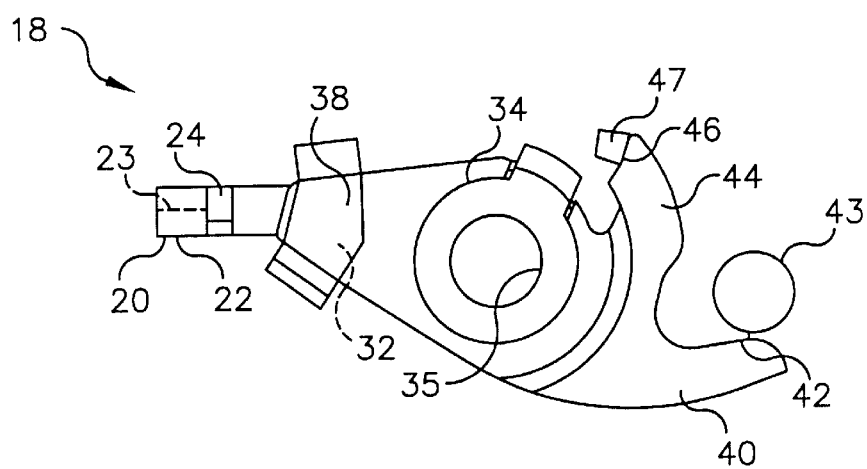
FIG. 3 is an elevational view of the HEL illustrated in FIG. 2 along the line 3—3.

With reference now to FIGS. 1, 2, and 3, the shutter mechanism 1 of the illustrative embodiment also includes a high energy lever 18 (hereinafter referred to as the HEL) having a finger 20 for striking the surface 16 of the arm 9 of the shutter blade 4. Specifically, the finger 20 of the HEL 18 includes a straight, lever-striking side wall 22 for impacting the surface 16 of the blade 4, and a cam engaging inclined side opposite from side wall 22 for engaging the rounded cam surface 17 of the shutter blade 4 on the return stroke of the finger 20. It is preferred that the finger 20 has a rounded projection 24. The rounded projection 24 is disposed along the upper edge of the finger 20 for slidably engaging the lower surface of an HEL retainer 50 discussed in more detail hereinafter. The rounded projection 24 reduces frictional contact with this retainer. The finger 20 is integrally connected in cantilever fashion to the lower end 26 of support arm 28. The upper end 30 of the arm 28 is integrally connected to a bushing 34 via integral portion 32. Bushing 34 has an inner diameter 35 which receives mounting post 36 (shown in FIG. 1) when the HEL is assembled into an operating position on the camera frame 3. Arm 28 has a middle portion 37 defined between the upper edge of the finger 20 and the lower edge of the integrally connected portion 32 (as best seen in FIG. 2). A spring retainer 38 is integrally connected to and extends upwardly from the edge of the upper end 30 of the support arm 28. The purpose of the spring retainer 38 is to retain one end of a torsion spring which circumscribes the bushing 34 and biases the finger 20 in the direction illustrated by the arrows in FIG. 6.

With reference now in particular to FIG. 3, the HEL further includes a cam follower arm 40 having an inner surface 42 that engages the lobe of a cam 43 in order to cock the HEL into the position illustrated in FIG. 6 against the bias of the unillustrated torsion spring. The HEL further includes a latch 44 having a surface 46 which engages a shutter release 47 when the HEL is cocked into the position shown in FIG. 6.

The relative dimensions between the finger 20 and various portions of the support arm 28 of the HEL of the first illustrative embodiment have been chosen to minimize the probability of shutter failure due to relative flexure between the arm 28 and finger 20 as the finger 20 strikes the lever portion 15 of the shutter blade 4. FIG. 2 illustrates that the total length L of the support arm 28 (which is formed from lengths $L_1+L_2+L_3$) is only about 2.30 times the length $L_4$ of the finger 20. Additionally, the length $L_3$ of the middle portion 37 of the support arm 28 defined between the lower edge of the integrally connected portion 32 and the upper edge of the finger 20 is only about 30% as great as the $L_4$ of the finger 20. The relatively thick and compact dimensioning of the support arm 28 relative to the finger 20, in combination with the short length of the middle portion 37 of the arm 28, provide an HEL which, although integrally molded from a flexible plastic material, will rigidly resist unwanted torsional and shear flexure between the finger 20 and the arm 28 when the unillustrated torsion spring that surrounds the bushing 34 sweeps the finger 20 in an arcuate path that strikes the surface 16 of the lever portion 15 of shutter blade 4.

With reference now to FIGS. 4 and 5, the shutter mechanism 1 of the first illustrative embodiment further includes an HEL retainer 50 that engages the rounded projection 24 of the finger 20 during the exposure operation to guide and maintain the finger 20 in captive fashion so that the finger 20 will not slip above the lever portion 15 of the shutter blade 4 and thereby cause a failure of the shutter mechanism 1. To this end, the HEL retainer 50 includes an arcuate retainer wall 52 which is integrally formed into the camera frame 3 by means of integral brackets 54a,b. Thus, both the post 13 and the HEL retainer 50 are formed integrally (molded) with the camera fame 3 and their positions, relative to one another, are fixed. We discover that this feature minimizes the shutter speed variations while decreasing assembly costs. The bottom surface 56 of the arcuate retainer wall 52 provides the guide surface for the rounded projection 24 of HEL finger 20 during the operation of the shutter mechanism 1. As can be appreciated best in FIGS. 4 and 5, the integral brackets 54a,b essentially render the retainer wall 52 as part of the frame 3 of the camera. Hence, the retainer wall 52 provides a positive and vibration free guide for the finger 20 of the HEL and, the guide and the mounting post for the shutter blade are formed in precisely the right place when the camera frame 3 is initially molded. The fact that the HEL retainer 50 and the post 13 are integrally formed (i.e., monolithic, for example, it is molded or cast as a single piece) along with the frame 3 is highly advantageous, as it obviates the need for the assembly of a separate part which may not be secured in its proper position during assembly, or which may shift from its proper position as a result of vibration caused by the operation of the camera. Thus, because the relative positions of the post 13 and the HEL retainer 50 are fixed, the HEL finger and the shutter are always located in proper positions with respect to one another.

FIG. 6 illustrates the operation of the shutter mechanism 1. In this Figure, the HEL is illustrated in a "cocked" position. In such a position, the HEL would be pivoted against the bias of a torsion spring (not shown) and latched into the position illustrated in FIG. 6 by the action of a shutter release 47 acting against previously discussed surface 46 of latch 44. When the button of the shutter mechanism is depressed by the camera operator, the shutter release frees the latch 44, thereby allowing the torsion spring to rapidly snap the finger 20 in the arcuate path illustrated by the dotted arrow.

A little less than one-third of the way through this path, the lever striking flat side 22 of the finger 20 hits the striking surface 16 of the lever portion 15 of shutter blade 4, thereby pivoting the shutter blade 4 into the position illustrated by the dashed lines. When so pivoted, the shutter blade 4 strikes terminal 58, thereby actuating the electronic flash (not shown). After striking terminal 58, the biasing spring (not shown) of the shutter blade 4 then proceeds to pivot it back to the position illustrated in FIG. 6. All during this operation, it should be noted that the lower surface 56 of the wall 52 of HEL retainer 50 captively engages the upper edge of the HEL finger 20 via rounded projection 24, thereby preventing the finger from rising upwardly and missing the striking surface 16 of the shutter blade 4.

After the exposure operation is complete, the camera operator advances the film in the camera, which in turn causes a drive train to engage a cam lobe against surface 42 of the HEL. This in turn causes the HEL to pivot in the direction opposite from that indicated in the arrow in FIG. 6. As the finger 20 of the HEL sweeps backward, the inclined side 23 of the finger 20 engages cam surface 17 of the lever portion 15 of blade 4, thereby momentarily pushing the arm 9 of the blade 4 downwardly so that the finger 20 can get past the lever portion 15 and back into the position illustrated in FIG. 6. This downward movement of the arm 9 of the shutter blade 4 is made possible by the fact that the cam opening 11 at the upper end of the arm 9 is larger than the outer diameter of the pivot post 13. When the finger 20 is brought completely back into the position illustrated in FIG. 6, the unillustrated shutter release again latches onto surface 46, and the entire operation may again be repeated to expose a different section of the film behind the aperture 5.

Figure 7:
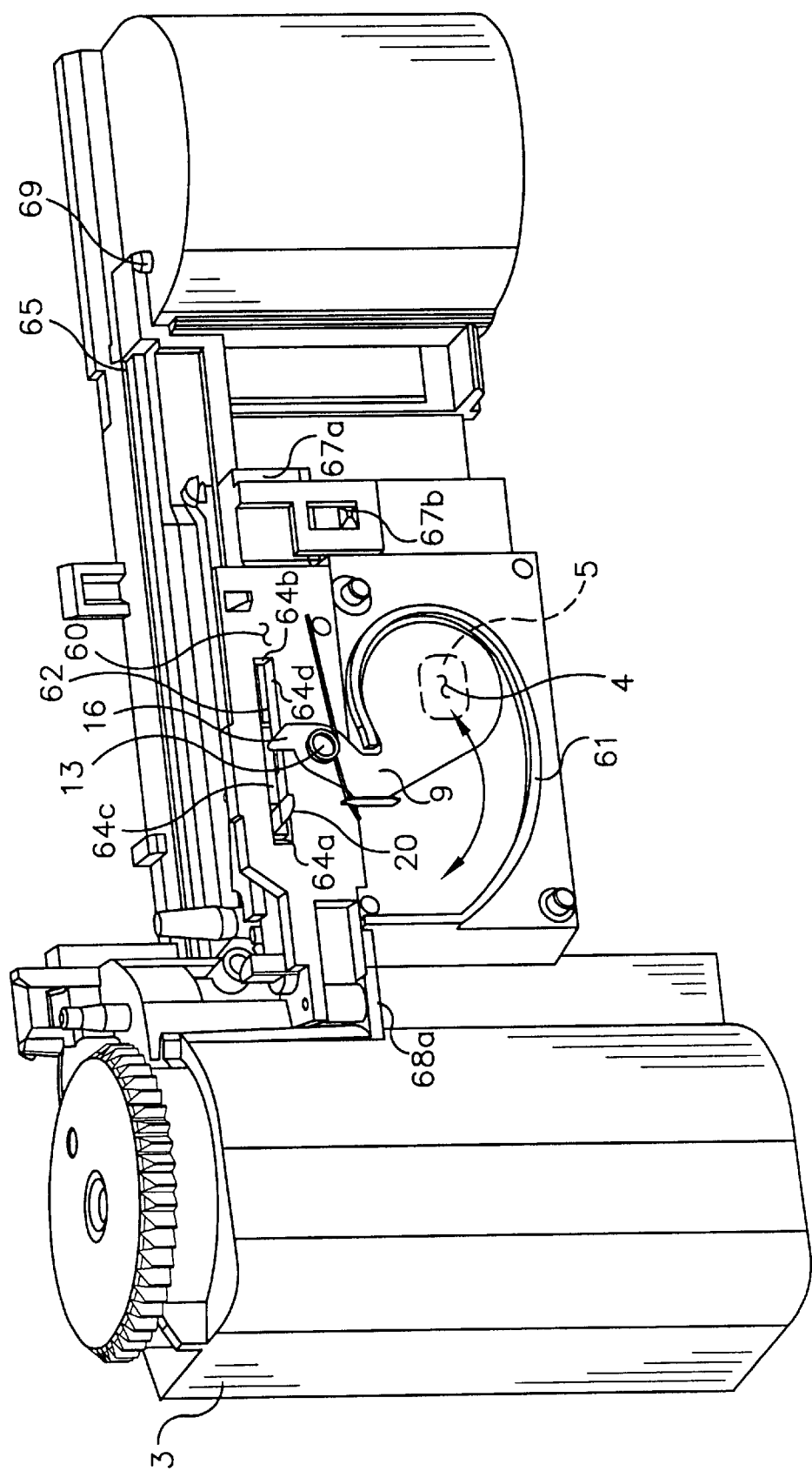
FIG. 7 is a perspective view of a second embodiment of a shutter mechanism of the present invention.

FIG. 7 illustrates the shutter mechanism of the second embodiment of the present invention. The shutter mechanism of this embodiment includes a mechanical plate 60 with a raised rib 61 and retainer 50. The rib 61 prevents an unwanted light that may otherwise leak around the shutter blade from entering the aperture 5. The mechanical plate is a part of a camera that is attached to a camera frame 3 and supports the shutter blade. The mechanical plate 60 is snapped to the camera frame 3 via a tongue and groove feature 65 connecting the mechanical plate to the camera frame (along the length of the mechanical plate). In addition, snap feature 67a (of the mechanical plate) engages a lug 67b of the camera frame 3 in order to hold the mechanical plate 60 firmly in place. The precise positioning of the mechanical plate 60 to the camera 3 is accomplished by utilizing positioning features, such as a post 68a which engages a hole 68b in the camera frame and the post 69a of the camera frame that blocks the mechanical plate from moving forward (disengaging from the tongue and groove features). The retainer 50 is formed by the walls 64a, 64b, 64c and 64d bordering an aperture 62. The wall 64c is linear and slidably engages and guides the edge of the finger 20 of the HEL 18 during the exposure operation to guide and maintain the finger 20 in captive fashion so that the finger 20 will not slip above the striking surface of the shutter blade 4 and thereby cause a failure of the shutter mechanism. The mechanical plate 60 and the post 13 are integral (i.e., monolithic). For example, they are molded or cast as a single piece. Hence, the mechanical plate 60 provides a positive guide for the finger 20 of the HEL and the precise positioning for the post 13 of the shutter blade, which are formed precisely in the right place when the mechanical plate 60 is initially cast or molded. The fact that both the post 13 and the aperture 62 are an integral part of the mechanical plate 60 is highly advantageous as it negates the need for precise assembly of the HEL finger and the striking surface of the shutter blade relative to one another and, results in better exposure control.

While this invention has been described with respect to the preferred embodiments, various modifications and additions may become apparent to persons of ordinary skill in the art. All such modifications, variations, and additions are intended to be encompassed within the scope of this patent application, which is more specifically defined by the claims appended hereto.

PARTS LIST

1. Shutter mechanism
3. Camera frame
4. Shutter blade
5. Light Aperture
7. Circular mask
9. Arm
11. Cam opening
13. Post
15. Lever portion
16. Striking surface
17. Cam surface
18. HEL
20. Finger
22. Lever striking flat side
23. Cam engaging inclined side
24. Rounded projection
26. Lower end
28. Support arm
30. Upper end
32. Integrally connected portion
34. Bushing
35. Inner diameter
36. Mounting post
37. Middle portion of arm
38. Spring retainer
40. Cam follower arm
42. Inner surface
44. Latch
46. Latching surface
50. HEL retainer
52. Retainer wall
54. Brackets a, b
56. Bottom surface of wall 52
58. Flash contact
60 Mechanical plate 62 Aperture
65 Tongue and groove feature 65
67a snap feature
67b lug 67b
68a post 68a
68b hole in the camera frame
69a post

What is claimed:

1. A shutter mechanism for a camera comprising:
   a support including an integrally formed post and a retainer, said retainer defining a path;
   a HEL with a projecting finger, said finger being movable along said path; and
   a shutter blade pivotally mounted on said post, said shutter blade having a lever portion and a masking portion, said shutter being movable into an exposure position by said finger.

2. The shutter mechanism defined in claim 1, wherein said support is a camera frame.

3. The shutter mechanism defined in claim 2, wherein said retainer includes a guide surface guiding said finger.

4. The shutter mechanism defined in claim 3, wherein
   said retainer includes a retainer wall providing said guide surface; and a plurality of integral brackets connected to said the retainer wall.

5. The shutter mechanism defined in claim 1, wherein said support is a mechanical plate attached to said frame.

6. The shutter mechanism defined in claim 5, wherein said mechanical plate includes a slot and said retainer bounds said slot.

7. The shutter mechanism defined in claim 6 wherein said slot is rectangular.

8. A shutter mechanism for a camera comprising:
   a frame having an integrally formed post and a retainer;
   a HEL including an arm rotatably mounted to said frame, and a finger projecting from an end of said arm that moves across an arcuate path when said arm rotates;
   a shutter blade pivotally mounted on said post and having a lever portion for pivoting a masking portion into an exposure position when struck by said finger, and
   said retainer retaining said finger in a shutter-striking arcuate path when said arm rotates.

9. The shutter mechanism defined in claim 8, wherein said retainer includes a retainer wall that retains an edge of said finger as said finger moves along said shutter-striking arcuate path.

10. The shutter mechanism defined in claim 9, wherein said retainer wall is arcuate in shape, and said retainer includes support brackets integrally connecting opposite ends of said retainer walls to said frame.

11. The shutter mechanism of claim 9, wherein said finger includes an engagement portion slidably engaging said retainer wall.

12. The shutter mechanism of claim 11, wherein said engagement portion includes a rounded projection reducing friction between said upper edge of said finger and said retainer wall.

13. The shutter mechanism defined in claim 8, wherein said arm includes an upper end connected to a rotatable mounting, and a lower end connected to said projecting finger, and wherein a length of said arm between said upper end of said arm and an upper edge of said projecting finger is shorter than a length that said finger projects from said lower end of said arm.

14. The shutter mechanism defined in claim 8, wherein said shutter blade is pivotally mounted at a point between said lever portion and said masking portion.

* * * * *